United States Patent [19]

Allely

[11] 4,192,123
[45] Mar. 11, 1980

[54] AGRICULTURAL MOWER

[75] Inventor: Robert Allely, Coventry, England

[73] Assignee: Massey-Ferguson Services N.V., Curacao, Netherlands Antilles

[21] Appl. No.: 863,641

[22] Filed: Dec. 23, 1977

[30] Foreign Application Priority Data

Jan. 6, 1977 [GB] United Kingdom ............... 00309/77

[51] Int. Cl.$^2$ ............................................. A01D 55/26
[52] U.S. Cl. ...................................... 56/13.6; 56/192
[58] Field of Search ........................ 56/192, 13.6, 6, 53

[56] References Cited

FOREIGN PATENT DOCUMENTS

| | | | |
|---|---|---|---|
| 1900164 | 7/1969 | Fed. Rep. of Germany | 56/13.6 |
| 1479813 | 3/1967 | France | 56/192 |
| 1485103 | 5/1967 | France | 56/192 |
| 1119645 | 7/1968 | United Kingdom | 56/192 |

*Primary Examiner*—Russell R. Kinsey
*Attorney, Agent, or Firm*—Robert L. Farris

[57] ABSTRACT

Tractor-drawn agricultural mower has three crop-cutting rotors rotatable about vertical axes and carrying crop-feeding drums. Two of the rotors contra-rotate inwards to feed cut crop between them. The third rotor is offset rearwards from a straight line intersecting the axes of rotation of the other two rotors and rotates in the same direction as the rotor adjacent it so that the crop which it cuts passes behind the adjacent rotor and towards the crop which has passed between the other two rotors, whereby a single swath of crop is produced by the mower.

2 Claims, 12 Drawing Figures

AGRICULTURAL MOWER

This invention relates to agricultural mowers having crop cutting rotors rotatable about upwardly extending axes. Such mowers are known in the art as rotary mowers.

More particularly, the invention relates to such mowers wherein each rotor comprises a blade carrier plate (for example in the form of an inverted saucer) on which a blade can be mounted so as to project outwardly from the periphery of the plate, together with an upwardly-extending crop feeding member (for example in the form of a drum) mounted on the blade carrier plate so that the blade carrier plate projects outwardly from the lower end of the crop feeding member around the periphery of the crop feeding member. An example of such a mower is a top-drive drum type rotary mower as disclosed in our British patent No. 1,376,719.

Rotary mowers of the kind set forth in the last preceding paragraph have become well-established during the past ten years for harvesting grass and related forage crops. Such mowers have displaced a significant proportion of cutterbar mowers from such operations due to the greater rate of harvesting of rotary mowers, to their low servicing requirements and to the well-defined swath which they produce.

However, although rotary mowers having a cutting width up to about 1.70 meters have been in most respects entirely satisfactory, it is found that problems arise when attempts are made to make a mower with a significantly larger cutting width. A cutting width of about 2.14 meters represents the upper limit for the size of a two rotor implement since beyond that size the implement becomes uneconomically bulky and heavy.

On the other hand mowers having four rotors arranged in a line as two in-running contra-rotating pairs (i.e. an assembly of two two-rotor mowers) are somewhat unsatisfactory because such mowers produce two swaths of crop and therefore the machinery which follows the mower to effect subsequent treatment of the crop (e.g. a forage harvester) has to make just as many passes through the field as if the crop had been cut with a smaller two rotor mower. The provision of swath boards on a four rotor mower to move together the two swaths tends to cause blockage in heavy crops whereas the provision of rotary swathing members for the same purpose is either ineffective or too expensive and/or cumbersome.

It is an object of the present invention to provide an improved rotary mower of the kind set forth in the second paragraph of this specification and comprising three or more rotors and capable of producing a single swath of crop.

According to the invention there is provided an agricultural mower having first, second and third crop-cutting rotors, the rotors being rotatable about respective upwardly-extending axes and being positioned so as to be capable of cutting respective contiguous areas of crop during use, each crop-cutting rotor comprising a blade carrier plate, at least one blade which can be mounted on the plate so as to project outwardly from the periphery of the plate, and an upwardly-extending crop-feeding member mounted on the blade carrier plate so that the blade carrier plate projects outwardly from the lower end of the crop feeding member around the periphery of the crop feeding member, the mower further comprising a drive to rotate the crop-cutting rotors, the drive being connected to the first and second rotors so as to contra-rotate them in a direction such that, in use, adjacent portions of the first and second rotors move rearwards with respect to the direction of usual operative forward motion of the mower and crop cut by the first and second rotors passes between said rotors, characterized in that the third rotor is connected to the drive so as to be rotated in the same direction as the rotor adjacent to it, and the axis of rotation of the third rotor is offset rearwardly, with respect to the direction of usual operative forward motion of the mower, from a straight line joining the axes of rotation of the first and second rotors, so that the crop cut by the third rotor passes behind the rotor adjacent to it towards the crop which has passed between the first and second rotors.

The provision of the third rotor arranged to pass behind the adjacent rotor the crop which the third rotor cuts means that the third rotor not only acts as a cutting device but also acts as a swathing device, moving crop laterally towards that cut by the other two rotors. A fourth rotor can be analogously arranged at the other side of the first and second rotors so as to provide a double width implement which nevertheless produces a single swath.

Embodiments of the invention will now be described by way of example, with reference to the accompanying drawings, in which.

In the embodiment of FIGS. 1 to 7, an agricultural rotary mower 10 comprises an oblong rectangular rigid frame 12, a headstock assembly 14, first, second and third crop cutting rotors, 16, 18 and 20 respectively, and a ground-engageable support wheel 22.

Headstock assembly 14 is in the form of a rigid frame comprising a transverse square-section beam 23 from which project lower connectors 24 for connection to the draft links 25 of a tractor 25A and a mast or upper connector 26 for connection to the tractor's top link 27. It should be noted that the height of draft links 25 is pre-set during mowing by stay bars 27A interconnecting lower connectors 24 and a fixed point (the long pin) on the tractor 25A.

Frame 12 comprises transverse front and rear beams 28, 30 respectively, and three fore/aft-extending frame members 32, 34, 36 welded thereto to form a rigid framework.

At its left hand end, frame 12 has a retractible parking stand 37 and is connected to headstock 14 for pivotal movement about a vertical axis 38 and about a horizontal axis 40 by a heavy duty hinge assembly 42. The hinge assembly comprises a hinge member 44 alongside and parallel to frame member 32, first and second hinges 46, 47 at each end of the hinge member defining a pivot axis 40, and a third hinge 48 adjacent the front end of hinge member and defining pivot axis 38.

First and second hinges 46, 47 extend laterally and connect hinge member 44 to frame 12. Third hinge 48 connects the hinge member to headstock 14, and for this purpose includes a pair of hinge plates 50 projecting rearwards from transverse beam 23.

Figure 1A:
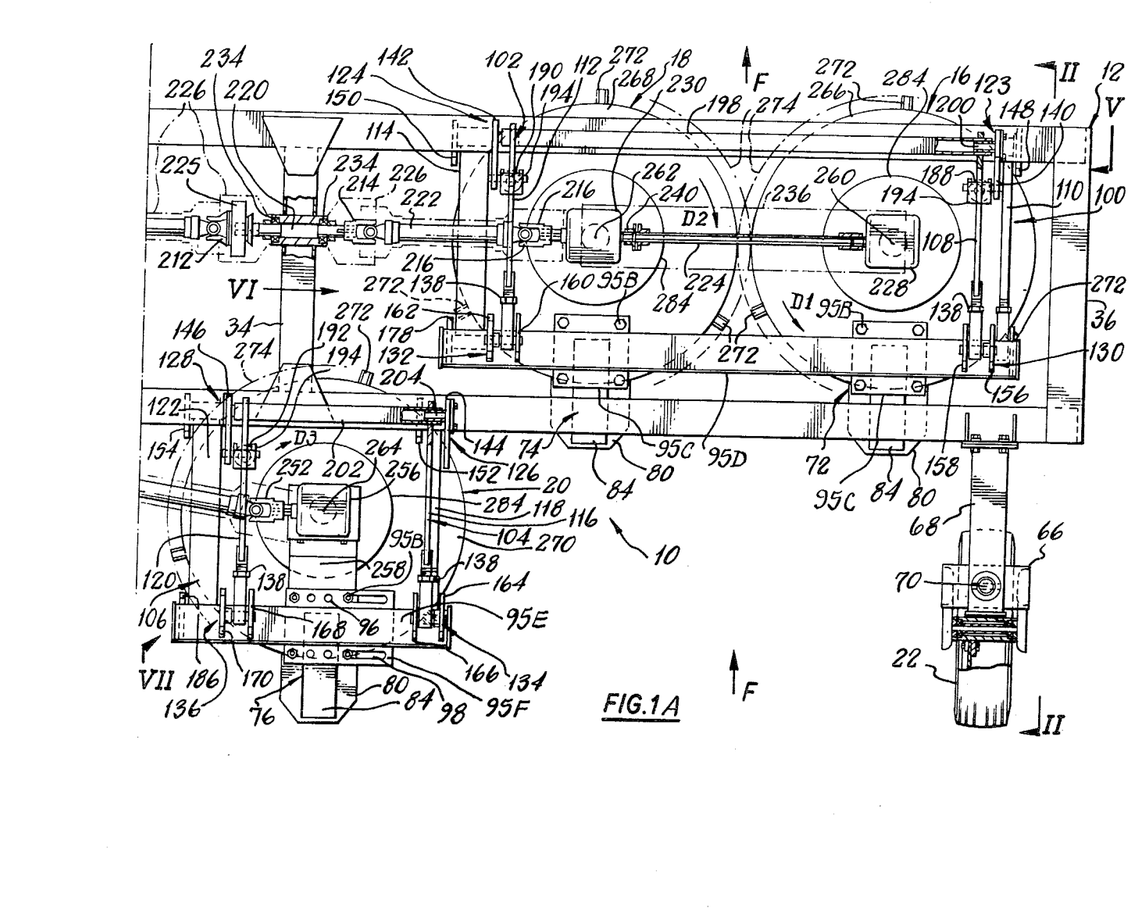
FIG. 1A shows a plan view of the right hand portion of an agricultural rotary mower.
Figure 1B:
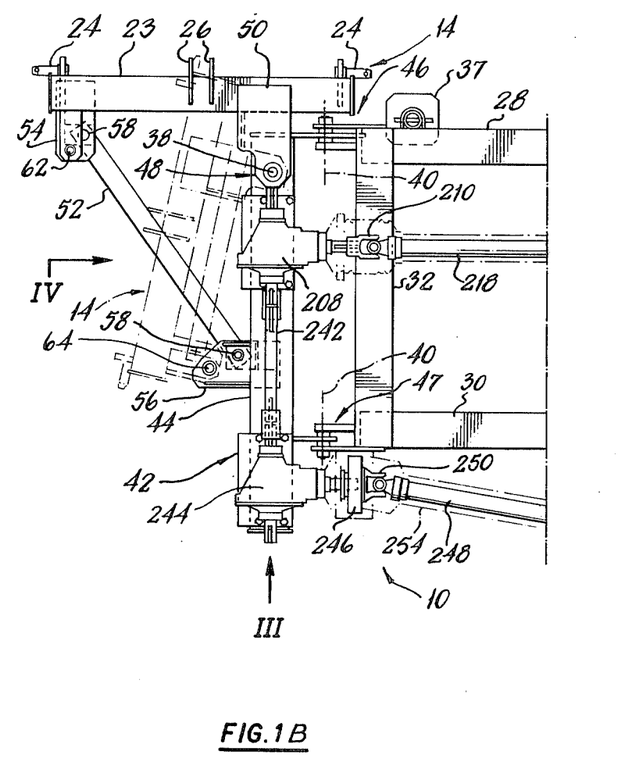
FIG. 1B shows a plan view of the left hand portion of an agricultural rotary mower.
Figure 4:
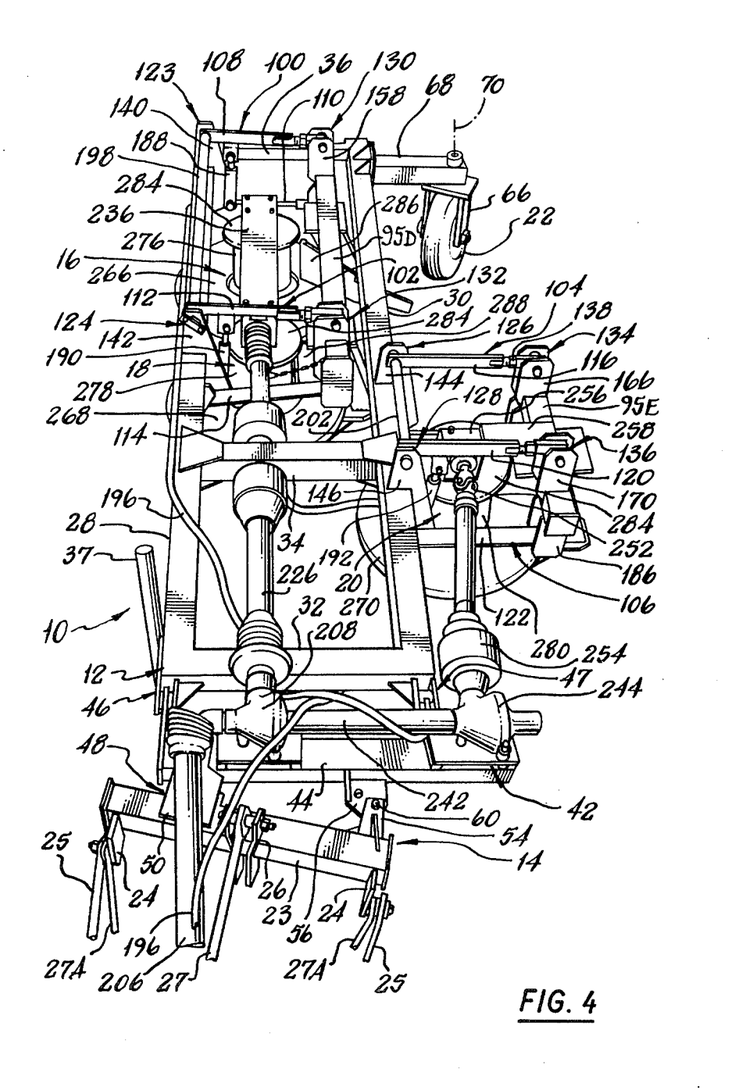
FIG. 4 shows a perspective view of the whole mower as seen from one side and above.

Headstock 14 is pivotable about axis 38 from its working position (position during mowing) shown in full lines in FIG. 1 to a transport position shown in FIG. 4 and shown also in broken lines in FIG. 1. The headstock is secured in its working position by a removable draft link 52 (see FIG. 1) which interconnects a rearwardly projecting bracket 54 on beam 23 of the headstock and a laterally projecting bracket 56 on hinge member 44. Link 52 is secured in position by removable pins 58, one at each end. The headstock is secured in its transport position by passing a pin 60 (see FIG. 4) through aligned apertures 62, 64 in brackets 54, 56 respectively.

Ground-engageable support wheel 22 is provided at the rear right hand end of mower frame 12. As shown in FIGS. 1, 2, 4 and 5 the wheel is connected to frame 12 through a fork member 66 journalled in a bracket 68 projecting rearwards from frame 12, so that wheel 22 functions as a castor wheel castoring about an axis 70. Bracket 68 is rigidly bolted to rear beam 30 of frame 12. Castor wheel 22 is entirely free to castor in any direction during mowing and transport operations.

The manner in which crop-cutting rotors 16, 18 and 20 are mounted to frame 12 will now be described.

Each of the rotors 16, 18 and 20 is journalled for rotation on its own draught-force-transmitting support structure 72, 74, 76 respectively, each support structure comprising a ground-engageable skid 78 having a forward end 79, a rearwardly-extending plate 80, a bearing assembly 82 (see FIG. 2) mounted on the forward end of the plate, and a downwardly-extending support leg 84 rigidly fixed to the rear end of plate 80.

Figure 2:
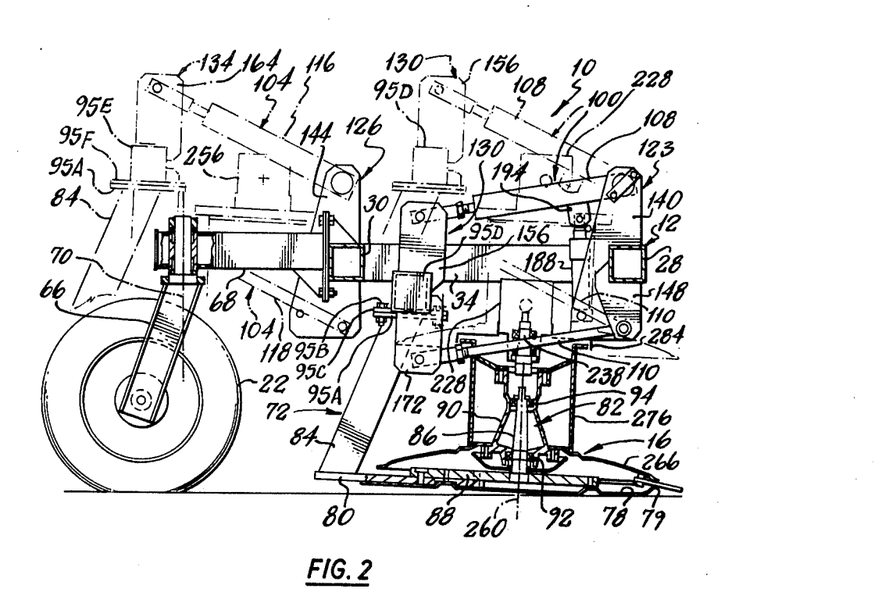
FIG. 2 shows a section on the line II—II in FIG. 1 and with certain items shown in section for illustration purposes.
Figure 3:
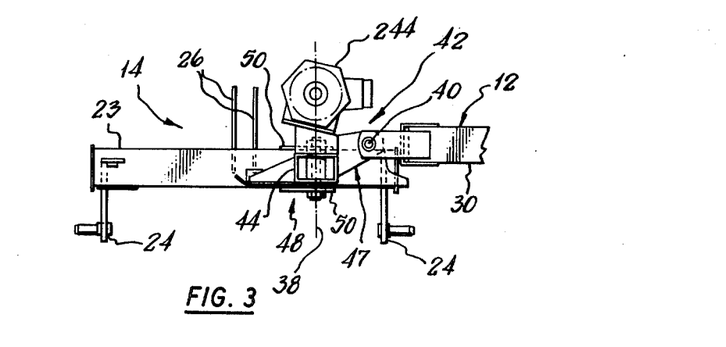
FIG. 3 shows a rear elevation view of a portion of the mower of FIG. 1, the direction of viewing being indicated by arrow III in FIG. 1.

As shown in FIG. 2, bearing assembly 82 comprises an upwardly-extending stub shaft 86 mounted on a support 88, the support being secured to skid 78 and to plate 80. A tubular light alloy drive shaft 90 is journalled on the stub shaft through two taper roller bearings 92, 94.

Skid 78 and bearing assembly 82 of each rotor are constructed and arranged generally as described in our British patent specification No. 1,489,373 to which the reader is directed for further details.

Each support leg 84 is formed with an attachment plate 95A at its upper end whereby it is detachably secured by four bolts 95B to a complementary attachment plate. In the case of rotors 16 and 18, the complementary attachment plates 95C are welded to a common rotor support beam 95D whereas in the case of rotor 20 an individual rotor support beam 95E is provided, to which the respective complementary attachment plate 95F is welded. Plate 95F has three pairs of apertures 96 and a pair of slots 98 to receive bolts 95B so as to provide three positions of rotor 20, these positions being spaced laterally with respect to the direction F of usual operative forward motion of the mower, so as to vary the amount of effective overlap of rotors 18 and 20 during mowing in direction F.

The rotor support beams 95D and 95E are mounted on mower frame 12 (and hence rotors 16, 18 and 20 are likewise mounted on the frame) by means of respective pairs of right and left hand parallelogram linkages 100, 102 and 104, 106.

Parallelogram linkages 100, 102 and 104, 106 each comprise pairs of parallel upper and lower links: 108, 110; 112, 114; 116, 118; 120, 122. These links are pivotally connected at their front ends to two pairs of right and left hand front bracket assemblies 123, 124 and 126, 128 fixed to the front and rear beams 28 and 30 respectively of frame 12. At their rear ends the links are pivotally connected to two pairs of right and left hand rear brackets 130, 132 and 134, 136 fixed to the rotor support beams 95D and 95E so that the rotors are pulled by the frame.

The upper links 108, 112, 116 and 120 of the parallelogram linkages 100, 102, 104 and 106 are each constituted by a length of thick steel plate or bar having a screw threaded adjuster 138 at its rear end whereby the length of the link and hence the attitude of the rotors can be adjusted. These upper links are mounted with their narrow side edges at the top and bottom (i.e. for maximum vertical stiffness) and constitute lift links. However, the lower left hand links 114 and 122, although formed of similar steel plate or bar, are mounted with their narrow side edges facing laterally so as to have maximum lateral stiffness and thereby resist lateral thrusts encountered by the rotors during use. The lower right hand links 110 and 118 serve to transmit tension and compression loads and are formed of round section bar stock.

Bracket assemblies 123, 124, 126, 128 and 130, 132, 134, 136 comprise spaced parallel rigid steel mounting plates welded to frame 12 and to beams 95D, 95E respectively, in upright attitudes. The links of parallelogram linkages 100, 102, 104 and 106 are pivoted between or adjacent the mounting plates of each pair so as to be freely angularly movable relative thereto. These mounting plates comprise four long plates 140, 142 and 144, 146 welded to front and rear beams 28 and 30 of frame 12 respectively and extending both above and below these beams, four short plates 148, 150 and 152, 154 welded below front and rear beams 28 and 30 of frame 12 to co-operate with the long plates, four pairs 156, 158; 160, 162; 164, 166 and 168, 170 of short plates welded above rotor support beams 95D and 95E respectively and four pairs 172, 174; 176, 178; 180, 182 and 184; 186 of short plates welded below the rotor support beams.

Three hydraulic lift rams 188, 190 and 192 are provided to raise the three crop-cutting rotors 16, 18 and 20 relative to the mower frame 12 for transport purposes and for manoeuvering the mower between swaths or passes in a field during harvesting.

Rams 188, 190 and 192 are mounted in upwardly extending attitudes. At their lower ends, the cylinders of the rams are pivotally connected to the lower ends of long plates 140, 142 and 146 respectively. At their upper ends, the pistons of the rams are pivotally connected to three bifurcated brackets 194 welded to the undersides of lift links 108, 112 and 120.

Hydraulic hoses 196 (see FIGS. 4 and 5) connect rams 188, 190 and 192 in parallel and connect them also to a hydraulic pump and control valve on the tractor 25A for simultaneous operation by the driver.

A torque tube 198 interconnects lift links 108 and 112 to ensure that the links are raised and lowered in unison. The forward ends of links 108 and 112 are welded to tube 198 and the tube is freely journalled on spigots or pins 200 (see FIG. 1) projecting laterally from plates 140 and 142. A similar torque tube 202 journalled on spigots 204 interconnects lift links 116, 120 of rotor 20 to ensure that the links are raised and lowered in unison by the single ram 192.

Rotors 16, 18 and 20 are arranged to be rotated by the power take-off shaft (not shown) of tractor 25A via a shielded telescope drive input shaft 206 having a universal joint at each end, and a combined right-angle drive and straight-through drive dual output gearbox 208.

The right angle drive output of gearbox 208 drives rotors 16 and 18 via universal joints 210, 212, 214 and 216, shafts 218, 220, 222 and 224, (shafts 218 and 222 being telescopic), a torque limiting clutch 225, (the joints, shafts 218 and 222 and clutch 225 being enclosed in shielding 226) and rotor gearboxes 228 and 230. Shaft 220 extends through frame member 34 and is journalled in ball races 234 therein. Gearboxes 228 and 230 which drive rotors 16 and 18 are interconnected by a plate 236 whereby their torque reactions cancel out. Both gearboxes have a downwardly-extending output shaft 238 connected to their respective rotor drive shafts 90 (see FIG. 2). Gearbox 230 has, in addition a straight through drive output shaft 240 for onward transmission of drive to gearbox 228.

The straight-through drive output of gearbox 208 drives rotor 20 via a shielded shaft 242, a right angle drive gearbox 244, a torque-limiting clutch 246 and telescopic drive shaft 248 with universal joints 250, 252 all enclosed in shielding 254, and a rotor gearbox 256 similar to gearbox 228 and connected to drive shaft 90 of rotor 20. A torque plate 258 interconnects gearbox 256 and rotor support beam 95E to transmit torque reaction from the gearbox to frame 12.

The directions of rotation of rotors 16, 18 and 20 are as shown by arrows D1, D2 and D3 respectively and the rate of rotation of each is about 1766 revolutions per minute—the drive ratio of the gearboxes being chosen appropriately according to the rate of rotation of the tractor p.t.o. shaft for which the mower is intended (e.g. 540 r.p.m. or 1,000 r.p.m.).

Crop-cutting rotors 16, 18 and 20 rotate about respective upwardly-extending axes 260, 262, 264 which are positioned so that the rotors are capable of cutting respective contiguous areas of crop during use. The rotors 16, 18, 20 themselves comprise respective blade carrier plates 266, 268, 270 each in the form of an annulus having a convex upper surface below the downwardly sloping lower surface of which three crop cutting blades 272 are pivotally mounted so as to project outwardly from the periphery of the plate. The outer ends of the blades trace cutting circles 274, in use. Three upwardly-extending crop feeding members 276, 278, 280 each in the form of a drum are mounted one on each blade carrier plate 266, 268, 270 respectively and arranged co-axially with the respective rotor axes 260, 262, 264 so that each blade carrier plate projects outwardly from the lower end of its crop feeding drum. A pair of sloping crop feeding ribs 282 are mounted on each crop feeding drum at diametrically opposed positions to assist swath formation. A non-rotatable cover plate 284 is mounted on each rotor gearbox 228, 230, 256 just above each of the rotor drums 276, 278, 280 to prevent entry of dirt and grass into the drums.

Three swath boards 286, 288 and 290 are mounted, one adjacent each of the rotors 16, 18 and 20 respectively to promote the production of a single well-defined swath. The swath boards are each mounted so that the approximately vertical front edge 292 of the board and its lower edge 294 are closely adjacent the crop feeding drum 276, 278 or 280 and its blade carrier plate 266, 268 or 270 respectively. The swath boards are mounted on the rotor support structures so as to be raised and lowered with the rotors.

Considering now the positions and directions of rotation or rotors 16, 18 and 20, it will be seen from FIG. 1 that the drive to first and second rotors 16, 18 contrarotates them (directions D1 and D2) so that in use, adjacent portions of their blade carrier plates 266, 268 move rearwards with respect to the direction of usual operative forward motion F of the mower and crop cut by the first and second rotors passes between them.

Third rotor 20 is rotated by the drive in the direction D3, which is the same direction as that of rotor 18 adjacent to it. However rotor 20 is positioned relative to rotors 16 and 18 so that its axis of rotation 264 is offset rearwardly with respect to direction F from a straight line joining the axes of rotation 260, 262 of rotors 16, 18. The amount of this rearward offset can be between one half and one and one half times the diameter of the cutting circle 274 defined by the outer end of the blades 272 of third rotor 20, and from this range is selected in this embodiment to be equal to the diameter of blade carrier plate 270 (all the three blade carrier plates being of the same diameter) i.e. slightly less than the cutting circle diameter. The maximum radial outward projection of each blade from the edge of its blade carrier plate is 35 millimeters.

As can be seen in FIG. 1, the cutting circles 274 traced by the outer ends of the blades 272 of rotors 18 and 20 are spaced apart by a distance of approximately one quarter of the diameter of the cutting circle 274 of rotor 20. This spacing, which may be reduced to one eighth of the said cutting circle diameter, has significance in relation to the passage of crop between rotors 18 and 20. However, as can also be seen in FIG. 1, the cutting circles 274 of rotors 18 and 20 overlap appreciably when viewed in the direction F of usual forward motion of the mower, whereby during use no strip of uncut grass is left between these rotors. The amount of this overlap can be adjusted by moving rotor 20 laterally by means of apertures 96 and slots 98 in attachment plate 95F.

In use, mowing proceeds with the mower in the position shown in FIG. 1. The rotors rotate in the directions shown, at about 1766 revolutions per minute. Crop cut by rotors 16 and 18 passes between these rotors to form a swath aligned approximately centrally with respect to the axes 260, 262 of these rotors in the same manner as in a conventional two-rotor mower.

The position and direction of rotation of third rotor 20 are such that the crop cut by the third rotor passes behind rotor 18, which is adjacent to rotor 20, towards the crop which has passed between the first and second rotors 16, 18 and is added thereto. Thus, by this arrangement of rotors the mower is able to form instantaneously and in one operation, a single swath from three crop cutting rotors without the necessity for moving two preformed windrows towards each other (which causes problems) and without the necessity for passing crop cut by one rotor in front of the next rotor (which interferes with the cutting efficiency of the latter rotor).

The spacial relationship of rotors 18 and 20 is such that they cut contiguous areas of crop and the crop cut by the rearwardly offset rotor 20 can freely pass between the rotors despite the fact that they both rotate in the same direction. The height of the stubble left by the mower depends on the attitude of the rotors, which is adjustable by means of adjusters 138 on the top links supporting the rotors. The rotors are usually set up at an angle of about 2½ degrees with respect to frame members 34, 36 of the mower (see FIG. 2).

During mowing, rotors 16, 18 and 20 can float up and down freely relative to frame 12 by virtue of their parallelogram linkage mountings, so as to follow ground contours. The hydraulic circuit containing rams 188, 190, 192 permits free circulation of fluid during mowing. Furthermore frame 12 itself is free to pivot about axis 40 relative to headstock 14.

Figure 5:
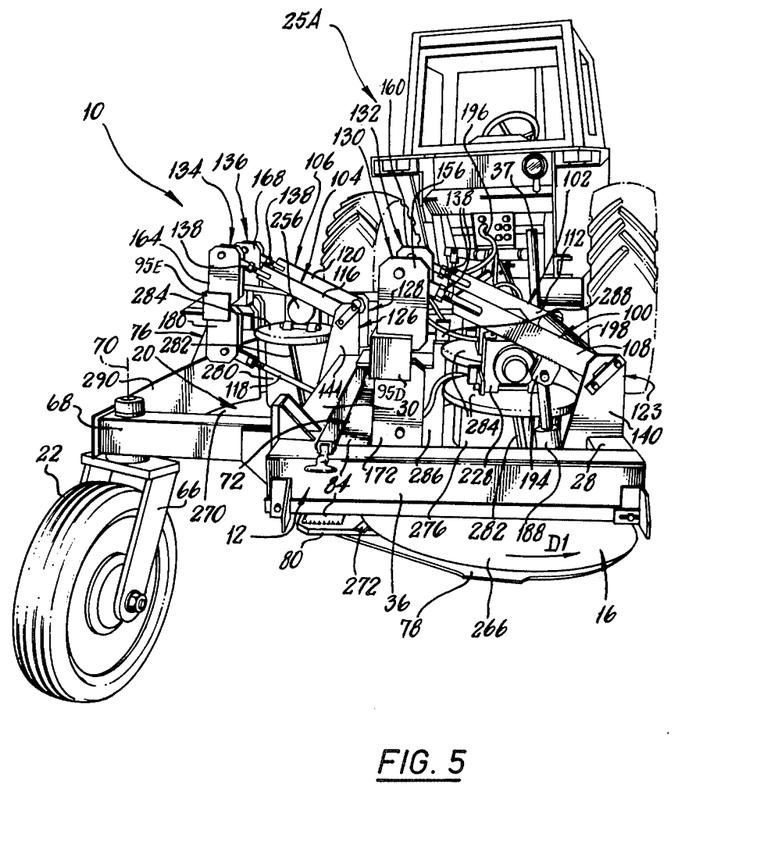
FIG. 5 shows a perspective view of the mower from the other side, the mower being shown attached to a tractor and in its transport position, the direction of viewing being indicated by arrow V in FIG. 1.
Figure 6:
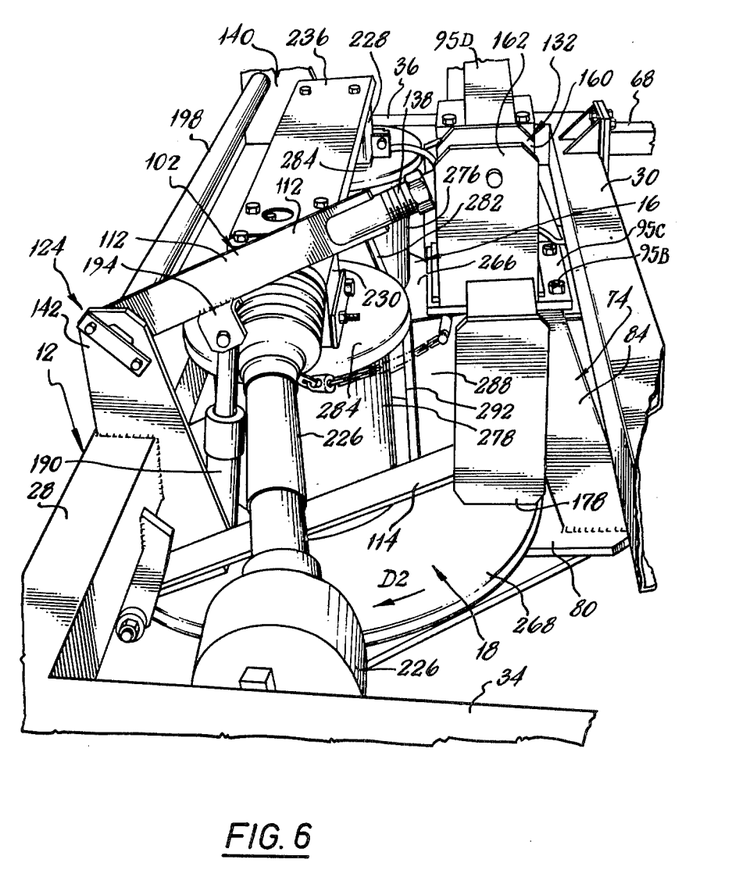
FIG. 6 is a perspective view of portions of the mower, the direction of viewing being indicated by arrow VI in FIG. 1A.
Figure 7:
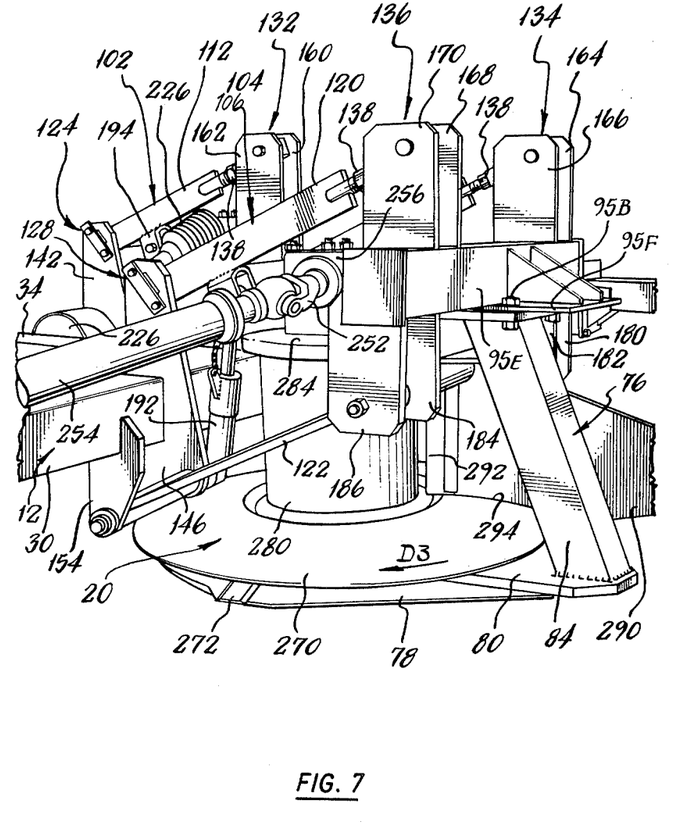
FIG. 7 is a perspective view of portions of the mower, the directions of viewing being indicated by arrow VII in FIG. 1A.

To raise rotors 16, 18 and 20 well clear of the ground at the end of a pass during harvesting, or for transport, rams 188, 190 and 192 are extended so as to raise the rotors to the position shown in FIG. 2 (broken lines) and in FIGS. 5, 6 and 7.

For road transport, the mower is pulled endwise by the tractor 25A as shown in FIGS. 4 and 5 (note that in FIG. 4 the rotors have not yet been raised). For this purpose it is merely necessary to pivot headstock 14 relative to frame 12 of the mower from the position shown in full lines in FIG. 1 to the position shown in broken lines. This is achieved by removing pins 58 at the ends of draft link 52 and removing the draft link itself. The tractor is then caused to gently push against the mower in the rearward direction, thus bringing the headstock to its road transport position. A pin (not shown) is then dropped into aligned holes 62, 64 in brackets 54, 56 and is secured in position by a linch pin. The mower is now ready for road transport. Castor wheel 22 merely follows the direction of movement of the mower in all modes of operation or transport or manoeuvering. It requires no manual re-positioning or the like.

In the embodiments of FIGS. 8 to 11 the crop cutting rotors are constructed substantially as in the embodiment of FIGS. 1 to 7, arrows F indicate the direction of usual operative forward motion of the mowers during mowing, and broken lines A are straight lines joining the axes of rotation of the first and second rotors. The circles representing the rotors indicate the peripheries of the blade carrier plates corresponding to plates 266, 268 and 270 in the embodiment of FIGS. 1 to 7, and from which the blades project. The directions of rotation of the rotors are indicated by arrows.

Figure 8:
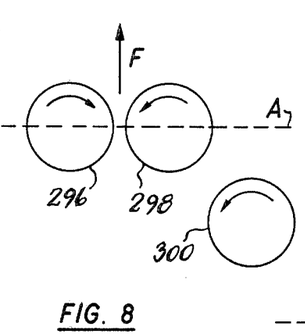
FIGS. 8 to 11 show diagrammatic plan views of the rotor dispositions in four further embodiments of the invention.

In the embodiment shown in FIG. 8 first, second and third crop cutting rotors 296, 298 and 300 respectively are arranged substantially as in the embodiment of FIGS. 1 to 7 but with the third rotor 300 on the right hand side of the other two instead of on the left hand side. The mower operates in a manner which is substantially identical to that of the mower of FIGS. 1 to 7.

Figure 9:
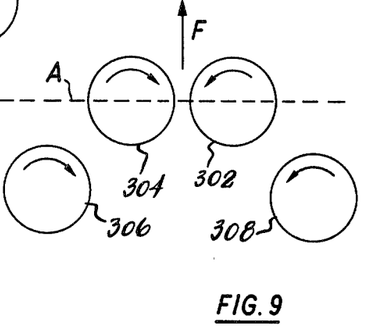

The embodiment of FIG. 9 can be considered as a hybrid of the rotor arrangements of FIGS. 1 and 8.

First, second and third rotors 302, 304, 306 respectively are arranged as in the FIG. 1 embodiment and operate as in that embodiment. A fourth crop-cutting rotor 308 is positioned on the other side of the first and second rotors from the third rotor 306. Rotor 308 rotates in the same direction as rotor 302 adjacent to it and crop cut by rotor 308 passes behind rotor 302 towards the crop which has passed between rotors 302 and 304 and is added thereto at the same instant as is the crop cut by rotor 306.

Figure 10:
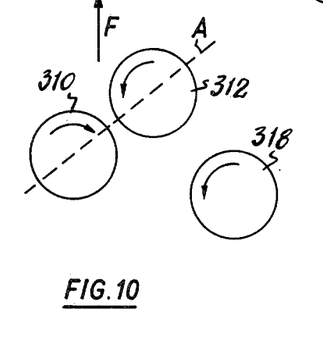
Figure 11:
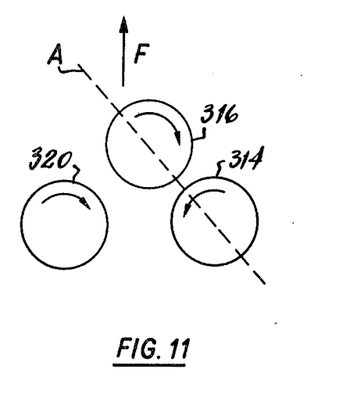

The embodiments of FIGS. 10 and 11 can be considered as variants of the embodiments of FIGS. 8 and 1 to 7 respectively in which the first and second rotors 310, 312 (FIG. 10) and 314, 316 (FIG. 11) are arranged with their axes on a line A inclined at less than 90 degrees to the direction F of usual operative forward motion of the mower. The third rotors 318 (FIG. 10) and 320 (FIG. 11) are arranged and operate in substantially the same manner as the rotors 300 and 20 described above.

Among modifications which could be made in the above embodiments, which are within the scope of the invention, are the following:

1. the use of modified blade carrier plates of, for example, frusto-conical form. The blade carrier plates need not be circular (as shown) but could be oval, for example;
2. the use of modified upwardly-extending crop feeding members in place of the cylindrical crop feeding drums used in the above embodiments, for example a cage of bars, or modified drum shapes such as drums with square, polygonal, oval or corrugated cross-sectional shapes;
3. the use of a bottom drive for the rotors e.g. a train of gears in a housing below the rotors—as in the well known bottom drive rotary mowers;
4. the use of a headstock which has no provision for connection to the top link of the tractor's 3-point hitch—with or without stay bars 27A.

I claim:

1. An agricultural mower comprising a frame; first, second and third crop cutting rotors, each crop cutting rotor including a rotor support, a blade carrier plate rotatably journaled on the rotor support for rotation about a generally vertical axis of rotation, a plurality of blades secured to the blade carrier plate and extending outwardly therefrom so that the outer free ends of the blades trace a cutting circle during rotation, and an upwardly extending crop-feeding member mounted on the upper surface of the blade carrier plate; mounting means mounting the first and second crop cutting rotors on the frame with generally vertical axes of rotation in a common generally transverse vertical plane and with their cutting circles overlapping; mounting means mounting the third crop cutting rotor on the frame to the rear and to one side of the first and second crop cutting rotors and spaced from the second crop cutting rotor a distance of at least one eighth of the diameter of the cutting circle of said third crop cutting rotor; drive means mounted on the frame and connected to and contra-rotating the first and second crop cutting rotors so that adjacent portions of the first and second crop cutting rotors move rearwardly and crop material cut by the first and second crop cutting rotors passes between their upwardly extending crop feeding members; and drive means mounted on the frame and connected to the third crop cutting rotor to drive said third crop cutting rotor in the same direction as the second crop cutting rotor so that crop material cut by the third crop cutting rotor passes between the second and third crop cutting rotors.

2. The agricultural mower of claim 1 wherein the third crop cutting rotor is spaced from the second crop cutting rotor a distance of less than a quarter of the diameter of the cutting circle of said third crop cutting rotor.

* * * * *